United States Patent
Rahgozar

(10) Patent No.: US 7,256,957 B1
(45) Date of Patent: Aug. 14, 2007

(54) CIRCUITS, SYSTEMS, AND METHODS FOR CAPACITIVE FLY HEIGHT MEASUREMENT

(75) Inventor: Parviz Rahgozar, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/325,760

(22) Filed: Jan. 4, 2006

(51) Int. Cl.
*G11B 21/02* (2006.01)
*G11B 27/36* (2006.01)

(52) U.S. Cl. .......................................... 360/75; 360/31
(58) Field of Classification Search ...................... None
See application file for complete search history.

(56) References Cited

U.S. PATENT DOCUMENTS

| | | | |
|---|---|---|---|
| 4,931,887 A * | 6/1990 | Hegde et al. | ................. 360/75 |
| 5,869,988 A | 2/1999 | Jusuf et al. | |
| 5,991,113 A | 11/1999 | Meyer et al. | |
| 6,775,338 B1 | 8/2004 | Sutardja | |
| 6,798,597 B1 | 9/2004 | Aram et al. | |
| 6,963,464 B2 | 11/2005 | Xu et al. | |
| 6,972,919 B2 | 12/2005 | Suk | |
| 2002/0001151 A1* | 1/2002 | Lake | ........................... 360/55 |
| 2003/0011915 A1* | 1/2003 | Riddering et al. | ............ 360/25 |
| 2005/0105204 A1 | 5/2005 | Bloodworth et al. | |
| 2005/0129090 A1 | 6/2005 | Sheperek et al. | |

OTHER PUBLICATIONS

Rahgozar et al., "Circuits, architechtures, apparatus, systems, and methods for maintaining constant spacing in a read/write apparatus for data storage," U.S. Appl. No. 11/355,459, filed Feb. 15, 2006.

\* cited by examiner

*Primary Examiner*—Andrew L. Sniezek

(57) ABSTRACT

Circuitry, systems, and methods for measuring the fly height of a read/write head in a magnetic data storage system. The circuitry generally includes a capacitance measurement circuit configured to measure the capacitance between the read/write head and the surface of the magnetic recording medium (or a derivative of that capacitance), and a fly height converter configured to produce an output signal corresponding to the fly height. The capacitance measurement circuit generally includes an input receiving a periodic signal with a generally constant voltage slew rate, coupled to the read/write head, and a current measuring circuit coupled to the read/write head. The present invention advantageously provides for electronically measuring the fly height of a read/write head in situ in a magnetic storage system. The sensed fly height may then be used by the system to control fly height actuation.

26 Claims, 11 Drawing Sheets

CIRCUITS, SYSTEMS, AND METHODS FOR CAPACITIVE FLY HEIGHT MEASUREMENT

FIELD OF THE INVENTION

The present invention generally relates to the field of magnetic recording systems. More specifically, embodiments of the present invention pertain to circuits, systems, and methods for measuring the distance ("fly height") between a read/write transducer ("head") and a magnetic storage medium in such systems, by measuring the capacitance between the read/write head and the magnetic storage medium.

DISCUSSION OF THE BACKGROUND

Magnetic storage systems, such as hard disk drives (HDDs), are used as mass storage in a wide variety of devices, including but not limited to personal computers, digital versatile disc (DVD) players, high definition television (HDTV) receivers, vehicle control systems, cellular or mobile telephones, television set top boxes, and portable media players. As these magnetic storage systems become smaller and/or attain higher data storage capacities, the density of data on the magnetic storage medium becomes higher.

A typical HDD includes magnetic storage media of one or more flat disks, called platters (sometimes also "disks" or "discs"). The platters are generally formed of two main substances: a substrate material that gives it structure and rigidity, and a magnetic media coating which holds the magnetic impulses (or moments) that represent data. A typical HDD further includes a read/write head, generally a magnetic transducer which can sense and/or change the magnetic fields stored on the platters. The read/write head is attached to a slider, generally an armature capable of placing the read/write head at a desired location over the platter. The height of the read/write head over the platter is the "fly height." The fly height of a HDD is a critical distance. If the fly height is too high, the magnetic fields will be too weak or dispersed for the read/write head to function. If the fly height is too low, there is an increased danger of a "head crash," wherein the read/write head touches the surface of the magnetic storage medium, thereby destroying data and/or damaging the read/write head or the magnetic storage medium.

As the density of data on the magnetic storage medium increases, the strength of the magnetic fields generally decrease, in order to minimize interference. Higher areal density in magnetic storage medium generally requires both advanced read/write transducer design and very fine control of the fly height of the read/write head. Therefore it is desirable to implement closed loop control of the fly height with both fly height actuation and fly height measurement.

One method of sensing fly height is to measure the capacitance between the read/write head and the magnetic storage medium. Capacitance is generally proportional to the distance between two surfaces. As shown in FIG. 1, a read/write head 101 is generally oriented at an angle with respect to the surface 102 of the magnetic storage medium. Therefore the capacitance between the read/write head and the surface of the medium may be determined according to the equation:

$$C = \varepsilon_0 WL * \frac{\ln[(d+s)/s]}{d} \tag{1}$$

where C is the capacitance, $\varepsilon_0$ is the dielectric constant, W and L are the width and length of the read/write head as shown in FIG. 1, s is the height of the trailing edge of the read/write head, and d is the height of the leading edge of the read/write head over s. FIG. 2 shows a graph of the relationship between the slider-to-disk capacitance and height s of the trailing edge of the read/write head.

Therefore it is desirable to implement a high speed and high resolution method and system for capacitive fly height measurement in the control circuitry of a magnetic storage system.

SUMMARY OF THE INVENTION

Embodiments of the present invention relate to circuitry, systems, and methods for measuring the fly height of a read/write head in a magnetic data storage system. The circuitry generally comprises a capacitance measurement circuit configured to measure the capacitance between the read/write head and the surface of the magnetic recording medium (or a derivative of that capacitance), and a fly height converter configured to produce an output signal corresponding to the fly height. The systems generally comprise those that include a circuit embodying one or more of the inventive concepts disclosed herein. The methods generally comprise the steps of (a) measuring the capacitance between the read/write head and the magnetic storage medium, and (b) calculating a value corresponding to the fly height of the read/write head from the measured capacitance.

The present invention advantageously provides for electronically measuring, in the storage system's control circuitry, the fly height of a read/write head in situ in a magnetic storage system using the capacitive technique. The system may use the capacitive fly height measurement to control fly height actuation.

These and other advantages of the present invention will become readily apparent from the detailed description of preferred embodiments below.

DETAILED DESCRIPTION OF THE PREFERRED EMBODIMENTS

Figure 1:
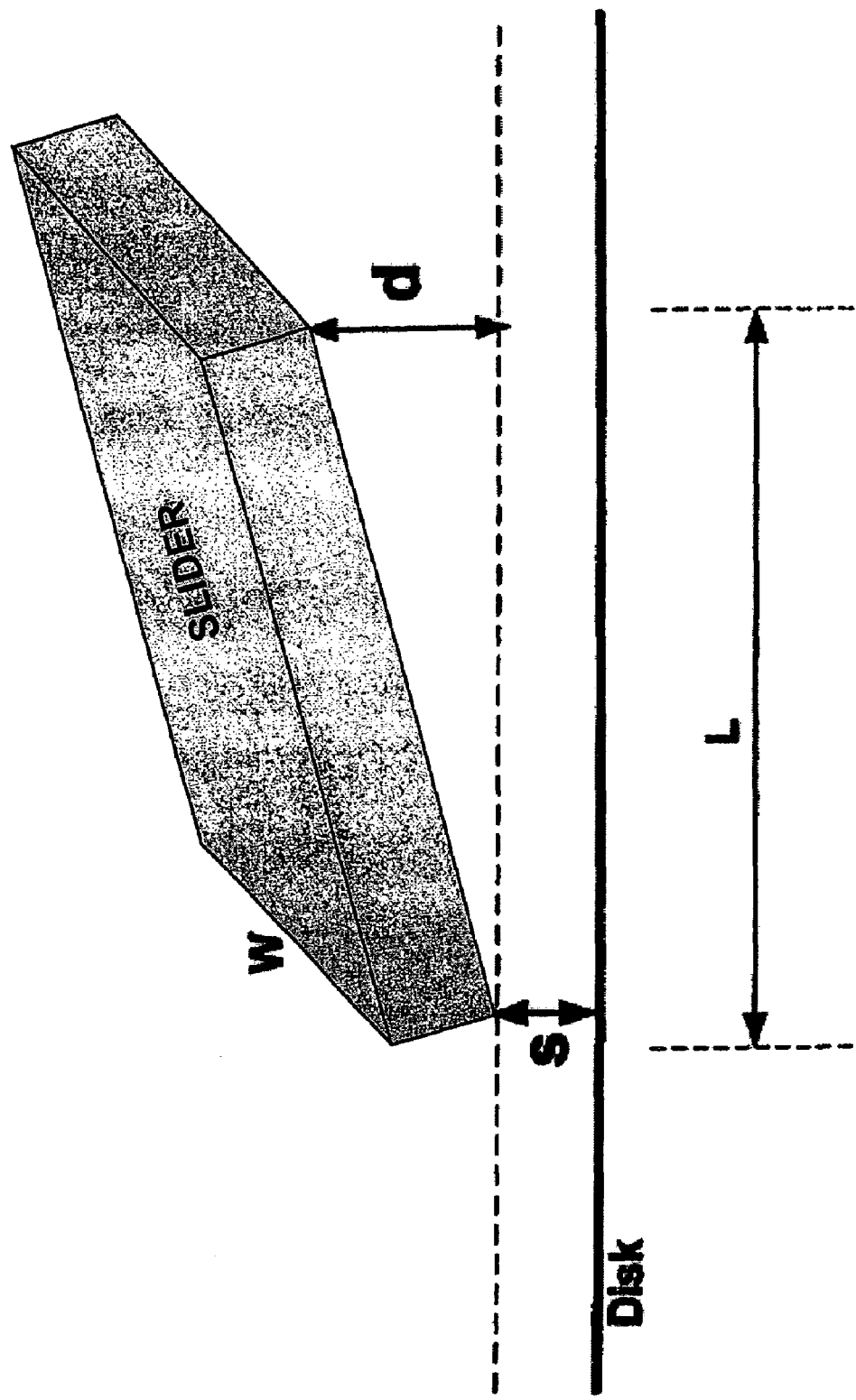
FIG. 1 is a diagram showing a read/write head in a magnetic storage system.
Figure 2:
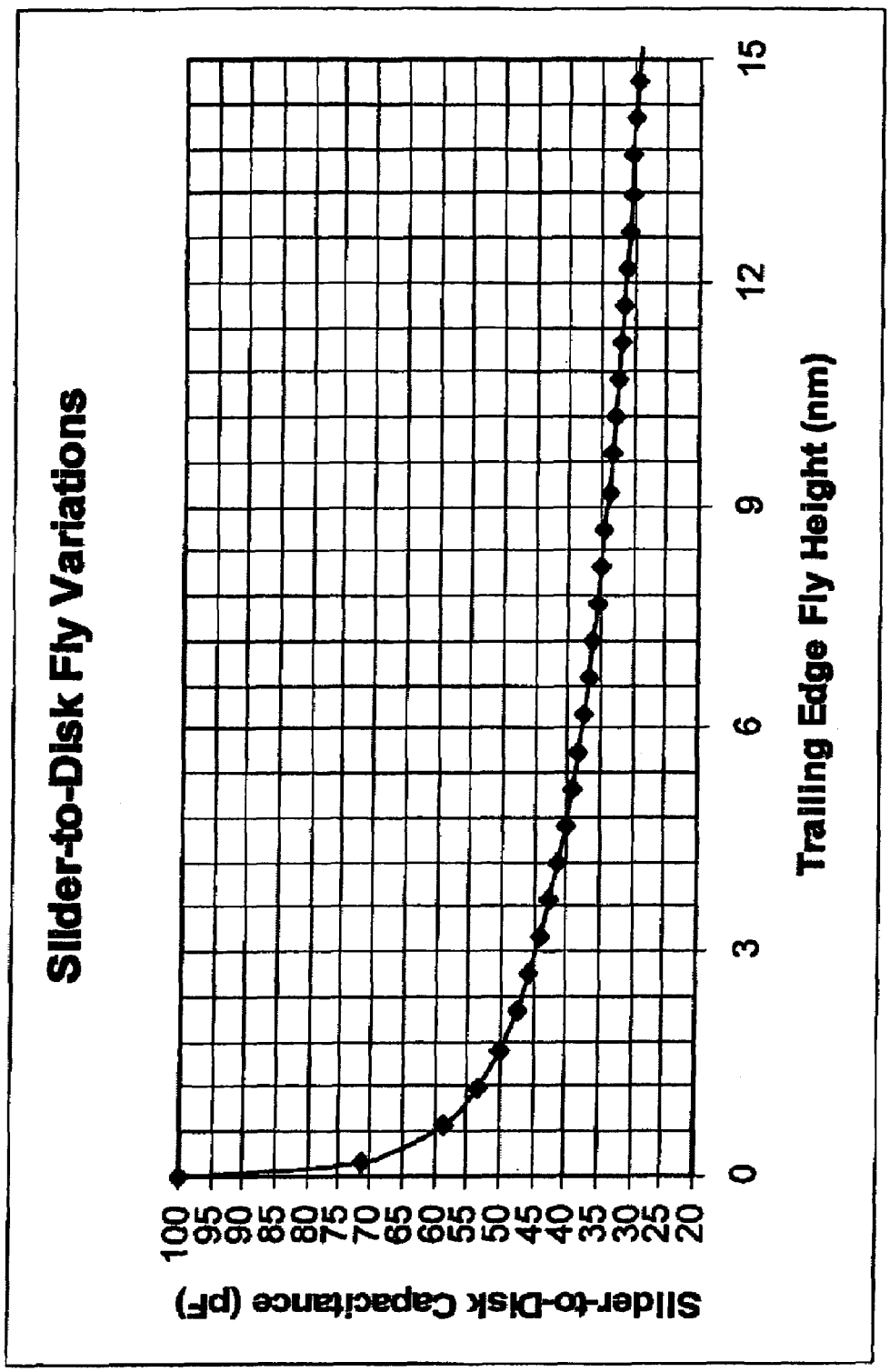
FIG. 2 is a graph showing a relationship between capacitance and fly height.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, circuit, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data or signal processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform," "signal," and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention relates to circuitry, systems, and methods for measuring the fly height of a read/write head in a magnetic data storage system. The circuitry generally comprises a capacitance measurement circuit configured to measure the capacitance between the read/write head and the surface of the magnetic recording medium (or a derivative of that capacitance), and a fly height converter configured to produce an output signal corresponding to the fly height (or a derivative thereof). The output signal may represent the fly height, the capacitance between the read/write head and the surface of the magnetic recording medium, a measured current value that is generally proportional to the fly height and/or capacitance, a voltage slew rate that is generally proportional to the fly height and/or capacitance, and/or any other value (or representation thereof) from which the fly height may be derived. The systems generally comprise those that include a circuit embodying one or more of the inventive concepts disclosed herein. The methods generally comprise the steps of (a) measuring the capacitance between the read/write head and the magnetic storage medium, and (b) calculating a value corresponding to the fly height of the read/write head from the measured capacitance.

The invention, in its various aspects, will be explained in greater detail below with regard to exemplary embodiments.

An Exemplary Circuit

In one aspect, the present invention relates to a circuit for measuring the fly height in a magnetic data storage system, comprising (a) a capacitance measurement circuit configured to measure the capacitance between the read/write head and the surface of the magnetic recording medium (or a derivative of that capacitance), and (b) a fly height converter configured to produce an output signal corresponding to the fly height. Thus, in an alternate embodiment, the present invention relates to a means for measuring a fly height, comprising (i) means for measuring a capacitance between a read/write head and the surface of a magnetic recording medium (or a derivative of that capacitance), and (ii) means for producing an output signal corresponding to the fly height from the measured capacitance. Referring to FIG. 3A, storage system control circuitry 310 includes capacitive fly height measurement circuit 320, connected to read/write head 350, which acts as one electrode or plate of a capacitor with respect to the surface of the storage medium coupled to ground 351. Fly height output 321 may be used by fly height actuator 322 to adjust the fly height (and thereby change the capacitance at 350). In a preferred embodiment fly height output 321 may comprise a serial or parallel digital value. Thus, an alternate embodiment may comprise means for providing a digital output from the means for measuring a capacitance.

It will be recognized that the capacitance may be measured indirectly, and that the fly height output signal may actually correspond to some derivative value. For example, the capacitance (C) may be related to a current (I) and a voltage slew rate (dV/dt) by the equation:

$$C = \frac{I}{dV/dt} \quad (2)$$

Therefore if voltage slew rate across the capacitor is known, current I may be measured to derive the capacitance, and thereby the fly height. Alternatively, if current I across the capacitor is known, then voltage slew rate may be measured to derive the capacitance. Generally it is easier to measure current than the voltage slew rate at high speeds. Therefore, in a preferred embodiment the voltage slew rate at the read/write head is kept constant and the current is measured to determine the capacitance and, in turn, the fly height (e.g. by use of Equation (1), above).

In a further embodiment the capacitance measurement circuit includes (a) an input receiving a periodic signal with a generally constant voltage slew rate, coupled to the read/write head, and (b) a current measuring circuit coupled to the read/write head. A periodic signal with a generally constant voltage slew rate may comprise a triangle wave. Circuits that generate triangle waves are conventional and well known in the art. As shown above, given a generally constant voltage slew rate dV/dt at the capacitor, current I may be measured to derive capacitance C, and thereby the fly height of the read/write head. Thus, in another embodiment the means for measuring capacitance may comprise (i) a means for applying a periodic signal with a generally constant voltage slew rate to the read/write head, and (ii) a means for measuring a current at the read/write head.

Figure 3B:
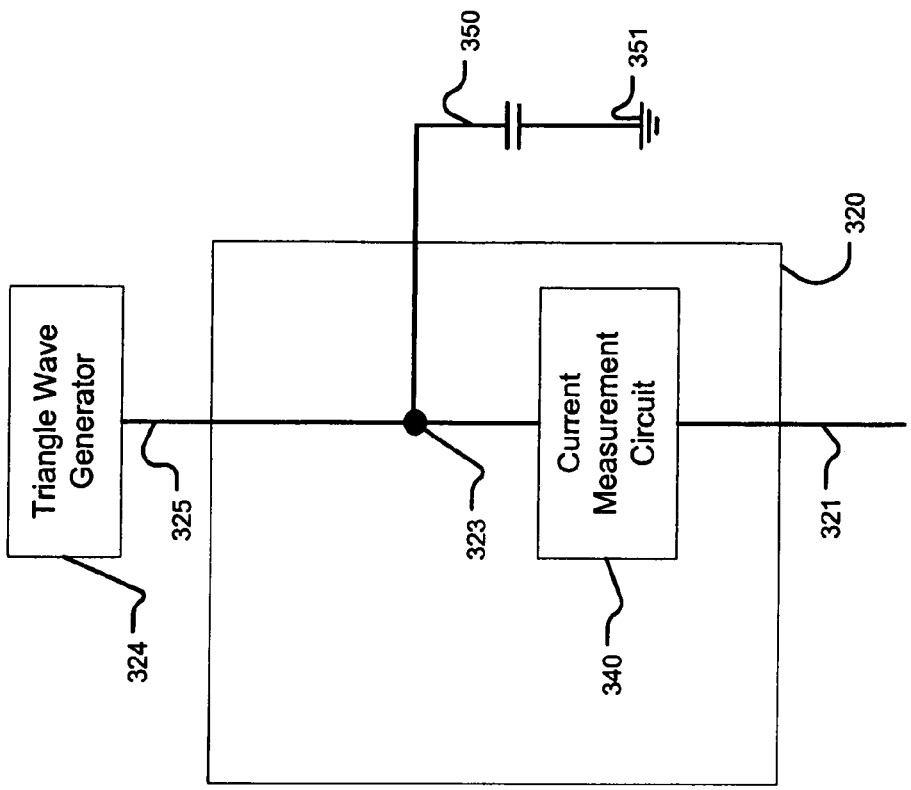
FIG. 3B is a diagram showing a fly height measurement circuit according to the present invention.
Figure 3A:
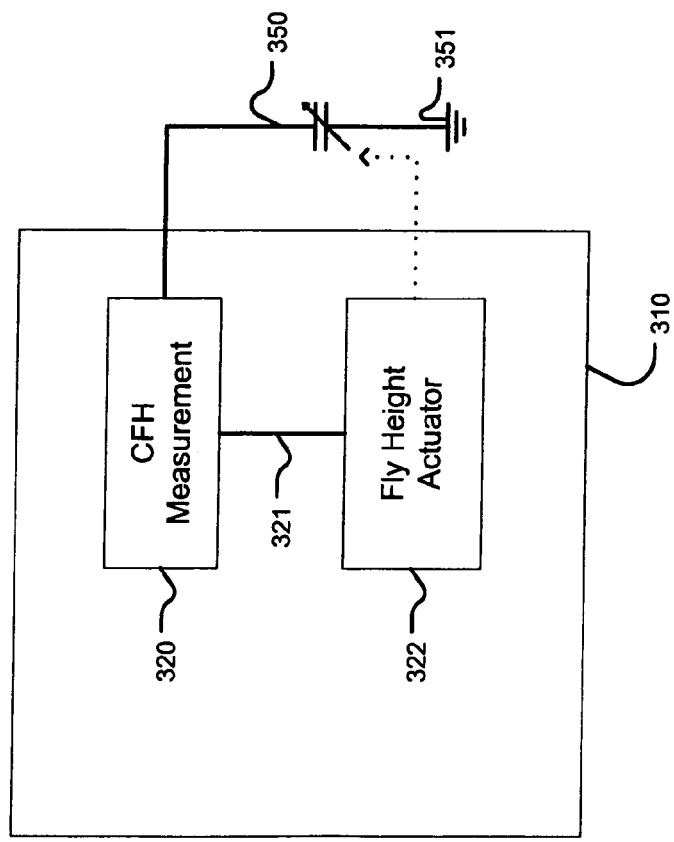
FIG. 3A is a diagram showing a magnetic storage system according to the present invention.

Referring now to FIG. 3B, capacitance measurement circuit 320 receives input 325 from triangle wave generator 324. Triangle wave 325 may also be coupled to read/write head 350. Current measurement circuit 340 may also be coupled to the read/write head to measure the current. As shown above, with a constant voltage slew rate the measured current is generally proportional to the capacitance (and thus the fly height) of the read/write head. Therefore, fly height output 321 may correspond to the measured current value. Thus, another embodiment may comprise a means for generating a triangle wave.

Figure 3C:
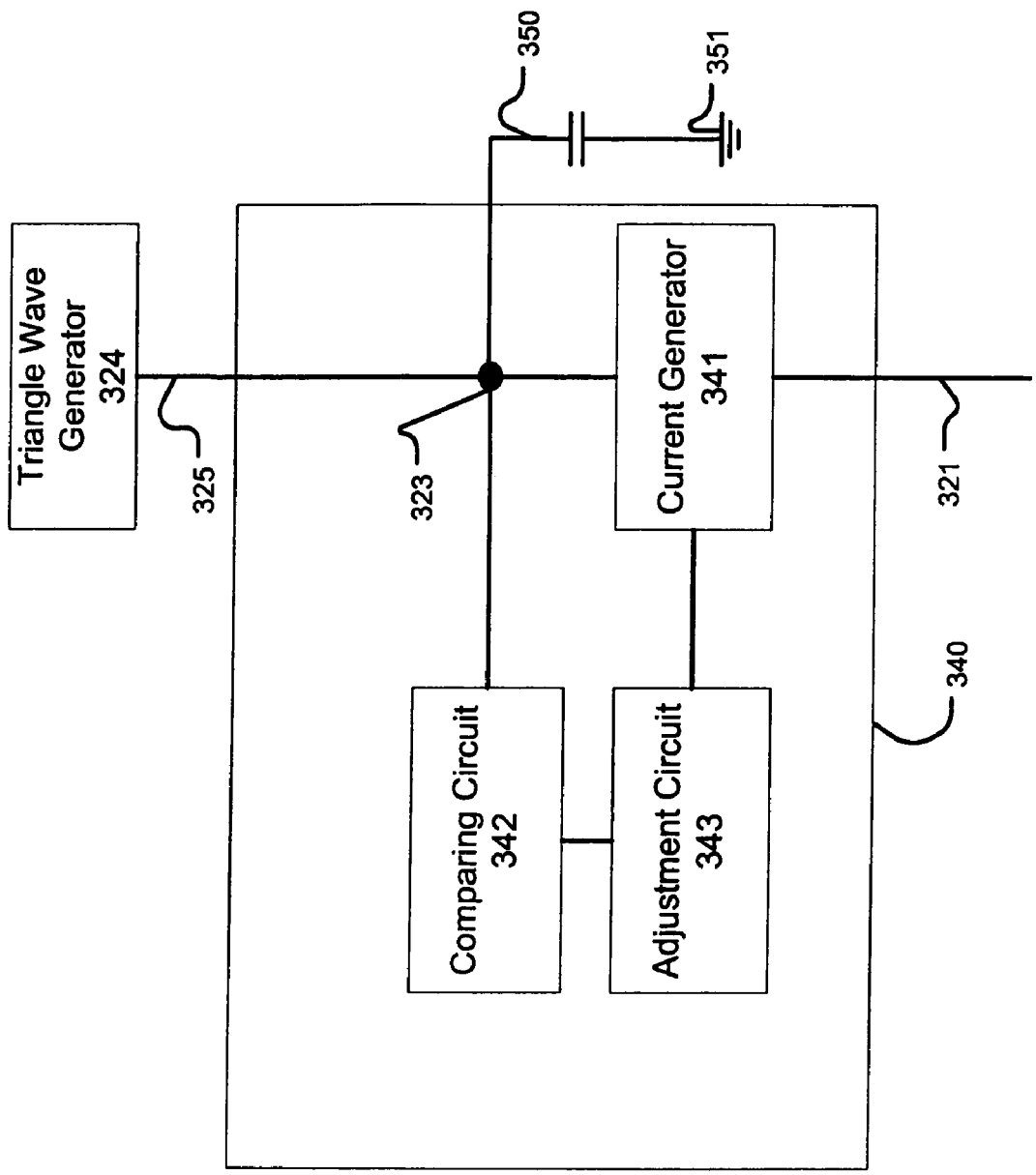
FIG. 3C is a diagram showing a fly height measurement circuit according to the present invention.

The current measuring circuit may comprise a feedback loop, wherein a counter-current is applied to the read/write head, and is adjusted until it negates the current of the periodic signal. In one embodiment, such a current measuring circuit may comprise (a) a current generator coupled to the read/write head, (b) a comparing circuit configured to compare a voltage potential at the read/write head to a ground or reference voltage potential, and (c) an adjustment circuit configured to adjust the current generator in response to an output of the comparator. Referring now to FIG. 3C, current measurement circuit 340 includes current generator 341 and comparing circuit 342 coupled to read/write head 350. Adjustment circuit 343 adjusts current generator 341 in response to the output of comparing circuit 342. Generally, current generator 341 applies a counter-current to the read/write head. Comparing circuit 342 compares the combined currents of current generator 341 and triangle wave generator 324 to ground. If the counter-current cancels out the current from the triangle wave generator, then the voltage at the comparator will equal ground. In that case, no adjustment will be necessary. Thus, in another embodiment the means for measuring current may comprise (i) a means for generating a current, (ii) means for applying the current to the read/write head, (iii) a means for comparing a voltage at the read/write head to a ground potential or reference voltage, and (iv) means for adjusting the means for generating a current in response to an output of the means for comparing.

Figure 6:
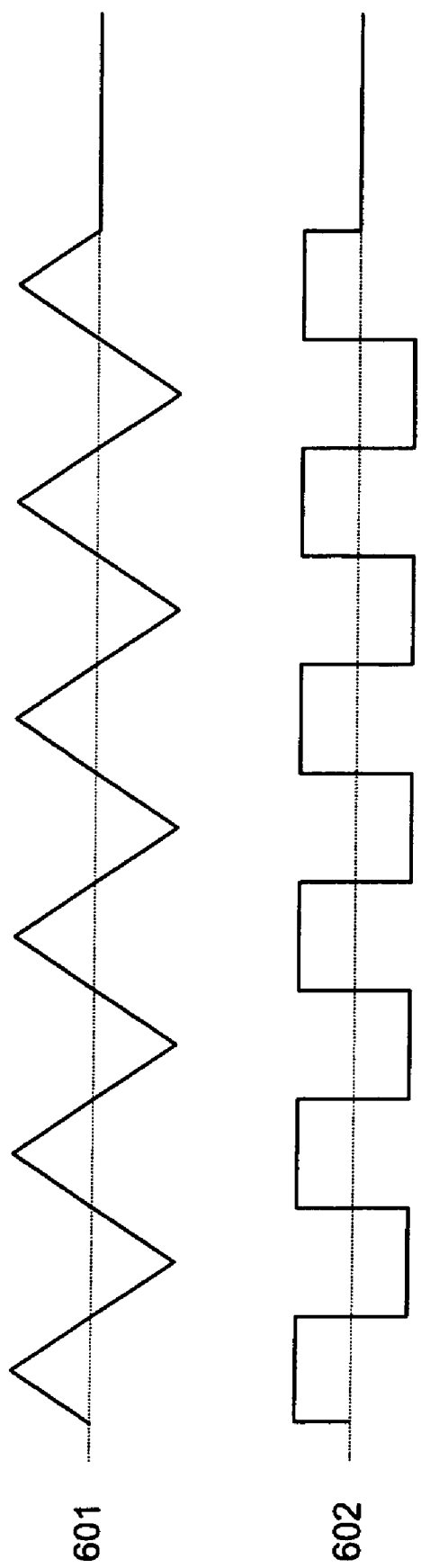
FIG. 6 is a timing diagram showing signals at particular nodes during operation of an embodiment of the present invention.

In a further embodiment, where the counter-current does not cancel out the current from the triangle wave generator, the voltage potential at read/write head 350 will generally not equal ground, and the comparing circuit produces pulses in response to the triangle wave. Thus, in another embodiment the means for comparing may comprise means for generating a pulse in response to the periodic signal when the voltage at said read/write head substantially differs from the ground potential or reference voltage. For example, and referring now to FIG. 6, triangle wave 601 may be received by comparing circuit 342, which may generate a corresponding pulse signal 602, received by adjustment circuit 343 and from which a corresponding adjustment to the counter-current may be made. The adjustment circuit may thus, in one embodiment, include a counter configured to count the pulses of the comparison circuit. Therefore, in another embodiment the means for adjusting may comprise a means for counting pulses from the means for comparing, and the means for generating a current may comprise means for producing a current output in response to a number of said pulses. The current generator may comprise a current digital-to-analog converter (I-DAC). Thus, the means for generating current may further comprise means for converting a digital signal to an analog current. Generally, when the triangle wave 601 has a voltage greater than 0, a pulse results in pulse signal 602. For each pulse, the counter will increment or roll over. The current produced by the I-DAC will then change in response to the new pulse count. If the new counter-current cancels out the current of the triangle wave generator, then generally the comparator will not pulse, and the pulse count will not change. At that point the counter value will generally correspond to the current at the read/write head, from which the capacitance and fly height can be derived. Therefore in another embodiment the fly height output may comprise a digital output corresponding to the pulse count (e.g. the number of pulses received by adjustment circuit 343).

Figure 5:
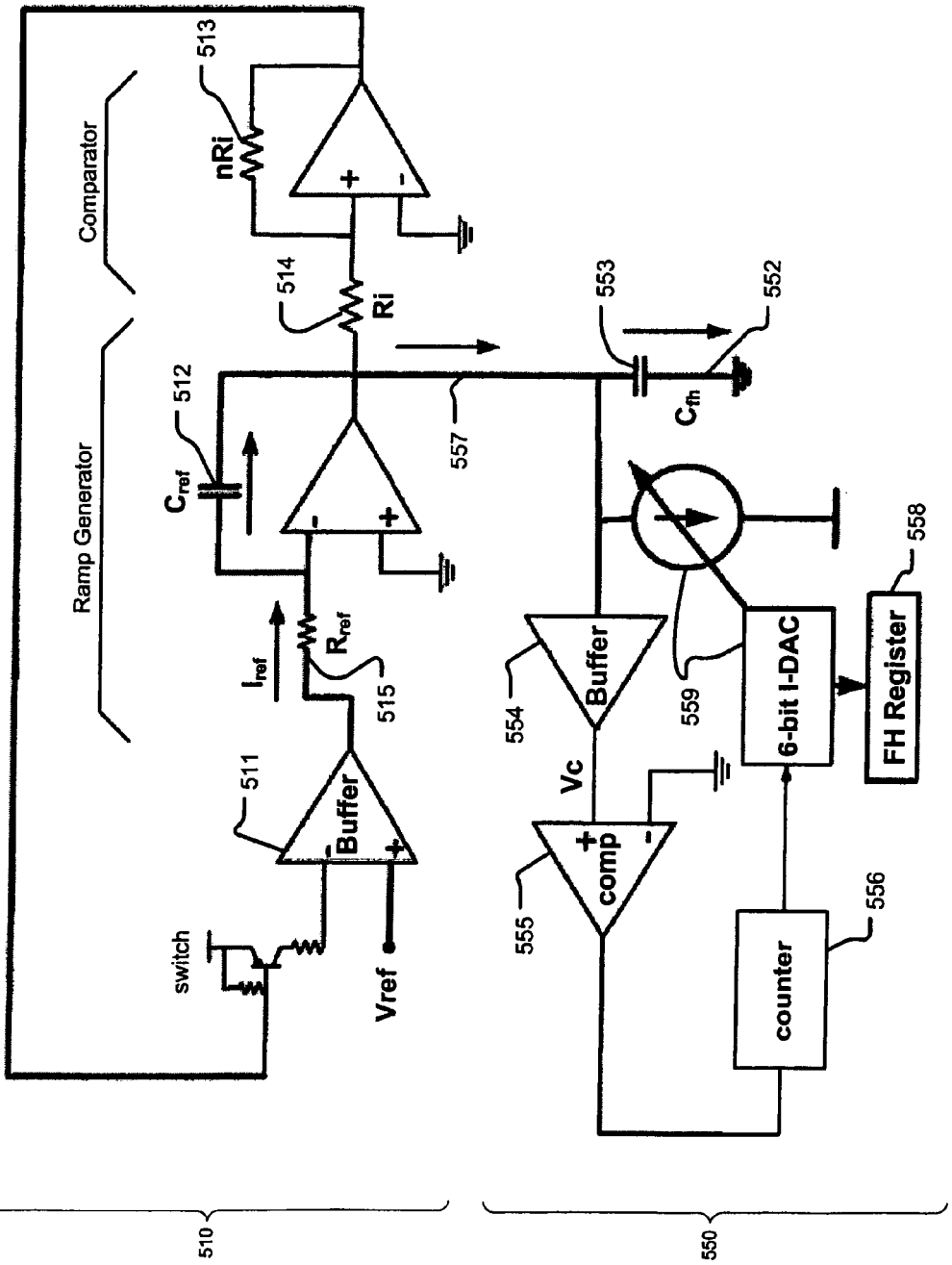
FIG. 5 is a diagram showing a fly height measurement circuit according to the present invention.

Referring now to FIG. 5, a preferred embodiment of a capacitive fly height measurement circuit according to the present invention is shown. Triangle wave generator 510 produces a triangle wave signal at output 557 coupled to read/write head 553. The triangle wave generator produces a signal with a constant voltage slew rate (dV/dt), measured in volts per second (V/s). The slew rate may be calculated in accordance with the equation:

$$dV/dt = \frac{I_{ref}}{C_{ref}} \quad (3)$$

where $I_{ref}$ is the current produced by buffer 511, and $C_{ref}$ is the capacitance of capacitor 512. The frequency of the triangle wave may be calculated in accordance with the equation:

$$F = \frac{n}{4R_{ref}C_{ref}} \quad (4)$$

where F is the frequency in Hz, n is the multiple (or ratio of the resistance) of divider resistor 513 (nRi) over resistor 514 (Ri), $C_{ref}$ is the capacitance of capacitor 512, and $R_{ref}$ is the resistance of resistor 515. The triangle wave generator 510 produces a signal with a constant voltage slew rate, applied to the read/write head (e.g., at 553).

Current measurement circuit 550 may comprise a feedback loop as described above, wherein a counter-current may be applied to the read/write head and be adjusted until it substantially cancels the current of the periodic signal. Current digital-to-analog converter (I-DAC) 559 produces a counter-current in response to counter 556. In a preferred embodiment, counter 556 comprises a 6-bit counter and I-DAC 559 comprises a 6-bit I-DAC. However, the counter and/or DAC may contain essentially any number of bits (e.g., 2 or more bits, for example from 3 to 12 bits), the actual number depending on the application and/or factors such as the desired granularity for the capacitance measurement and/or fly height calculation and/or determination.

The counter-current is generally coupled to the read/write head (e.g., at 553). The counter-current and periodic signal are then received by buffer 554, and the output of buffer 554 is coupled to an input of comparator 555. As described above, when the counter-current cancels out the current of the periodic signal, comparator 555 produces no output. When the counter-current does not cancel out the current of the periodic signal, comparator 555 produces pulses in response to the periodic signal. Each pulse produced by comparator 555 increments or rolls over counter 556. When I-DAC 559 produces a counter-current that cancels out the periodic signal, the comparator will no longer produce pulses, and the counter will no longer change. Therefore the count will correspond to the current drawn by the read/write head from the periodic signal generator. Fly height register 558 stores the digital value of the current, which may be used by a fly height actuator to adjust the current.

In a preferred embodiment, a capacitive fly height measuring circuit according to the present invention may be implemented in a preamplifier integrated circuit in a magnetic storage system. A magnetic storage system according to the present invention may comprise at least a read/write head, a magnetic storage medium, the above-described circuit or circuits for capacitive fly height measurement, and a fly height controller configured to adjust a distance between said read/write head and said surface in response to the output of the measurement circuit. Thus, an embodiment of the present invention may comprise means for measuring capacitive fly height measurement and means for adjusting the fly height in response to the means for measuring.

One fly height actuation method used in preamp ICs is the application of controlled power by the preamp to a resistive element in the recording head. Another method of fly height actuation is the application of controlled voltage by the preamp to a capacitor formed between the recording slider and the disk to create an electrostatic force. Circuits, systems, and methods for controlling the fly height, which may be used in conjunction with the fly height measurement circuits, systems, and methods of the present invention, are further described in U.S. patent application Ser. No. 11/355,459, filed on Feb. 15, 2006 and hereby incorporated by reference.

The System

In a further aspect of the invention, a capacitive fly height measuring circuit according to the present invention may be implemented in a preamplifier integrated circuit in a magnetic storage system. A magnetic storage system according to the present invention may comprise at least a read/write head, a magnetic storage medium, the above-described circuit or circuits for capacitive fly height measurement, and a fly height controller configured to adjust a distance between said read/write head and said surface in response to the output of the measurement circuit.

Figure 4B:
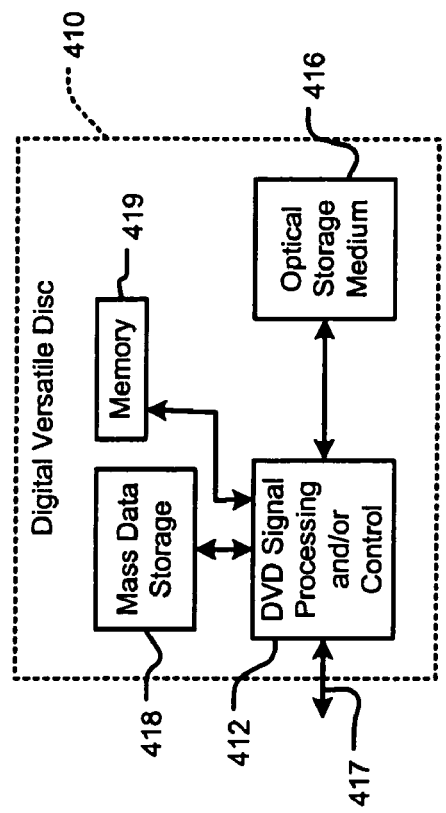
FIG. 4B is a diagram of an exemplary digital versatile disc (DVD) player using a mass storage device according to the present invention.
Figure 4A:
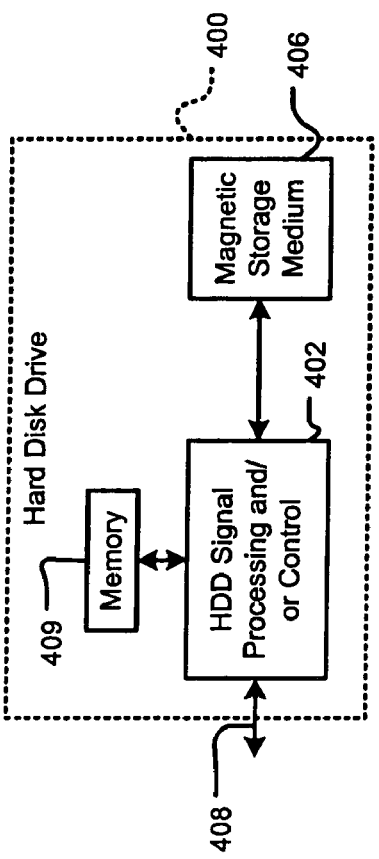
FIG. 4A is a diagram of an exemplary hard disk drive.

Various exemplary implementations of the present invention are shown in FIGS. 4A–4G. Referring now to FIG. 4A, the present invention can be implemented in a hard disk drive (HDD) 400. The present invention may implement control circuits, which are generally identified in FIG. 4A at 402. In some implementations, the control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 4B, the present invention can be implemented in a digital versatile disc (DVD) drive 410. The present invention may implement mass data storage of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 4A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 4D:
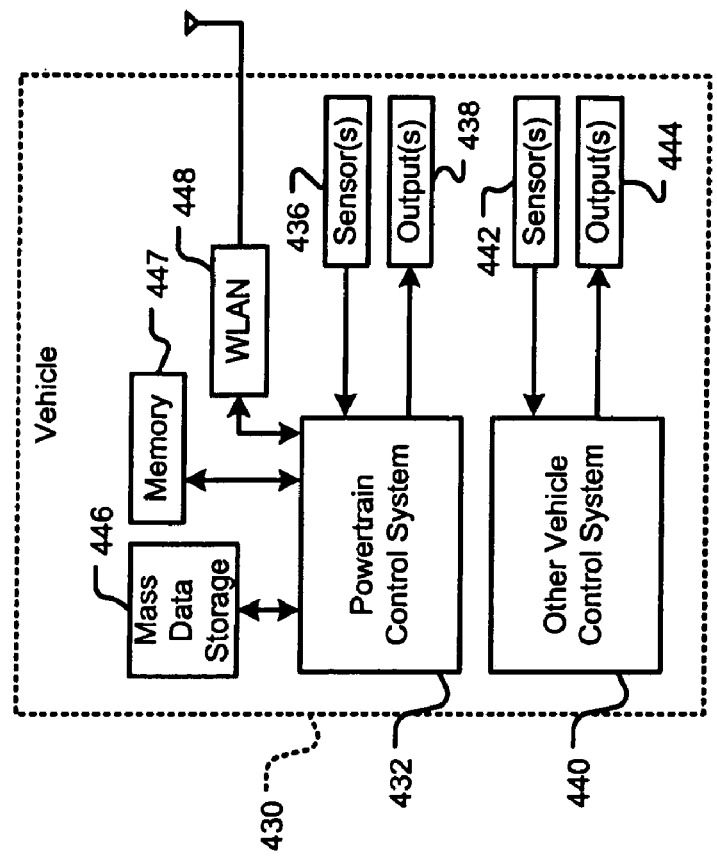
FIG. 4D is a diagram of an exemplary vehicle control system using a mass storage device according to the present invention.
Figure 4C:
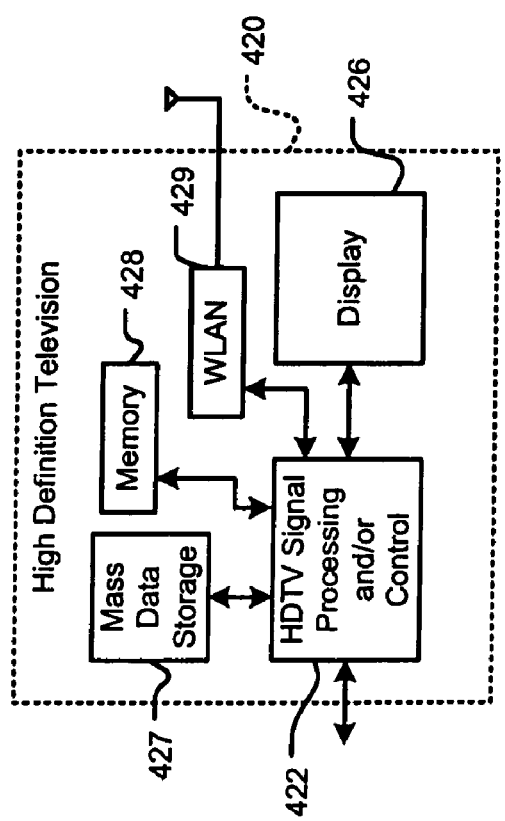
FIG. 4C is a diagram of an exemplary high definition television (HDTV) receiver using a mass storage device according to the present invention.

Referring now to FIG. 4C, the present invention can be implemented in a high definition television (HDTV) 420.

The present invention may implement mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 4A and/or at least one DVD may have the configuration shown in FIG. 4B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 4D, the present invention implements a mass data storage of the vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 4E:
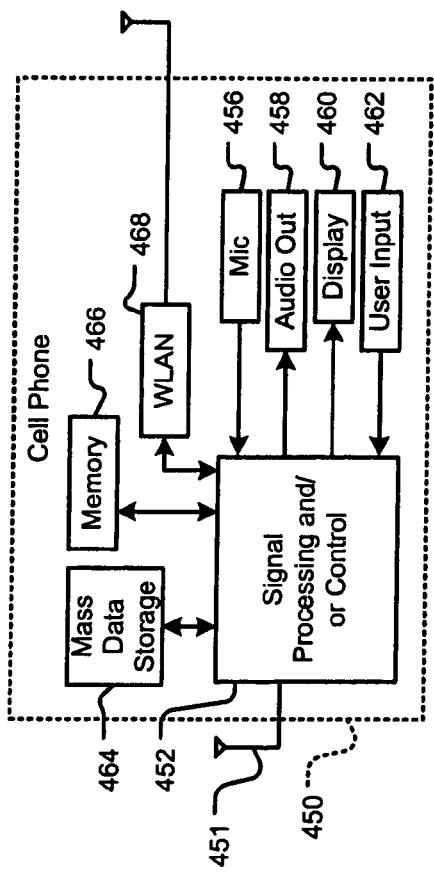
FIG. 4E is a diagram of an exemplary cellular or mobile phone using a mass storage device according to the present invention.

Referring now to FIG. 4E, the present invention can be implemented in a cellular phone 450 that may include a cellular antenna 451. The present invention may implement mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 4F:
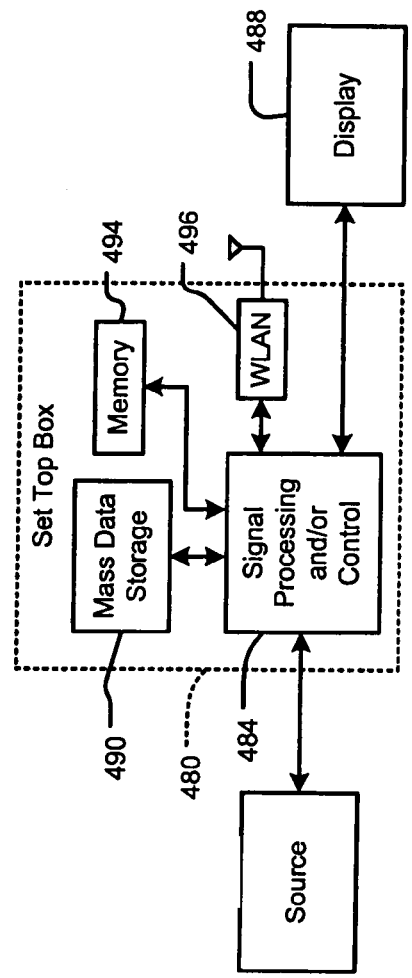
FIG. 4F is a diagram of an exemplary television set top box using a mass storage device according to the present invention.
Figure 4G:
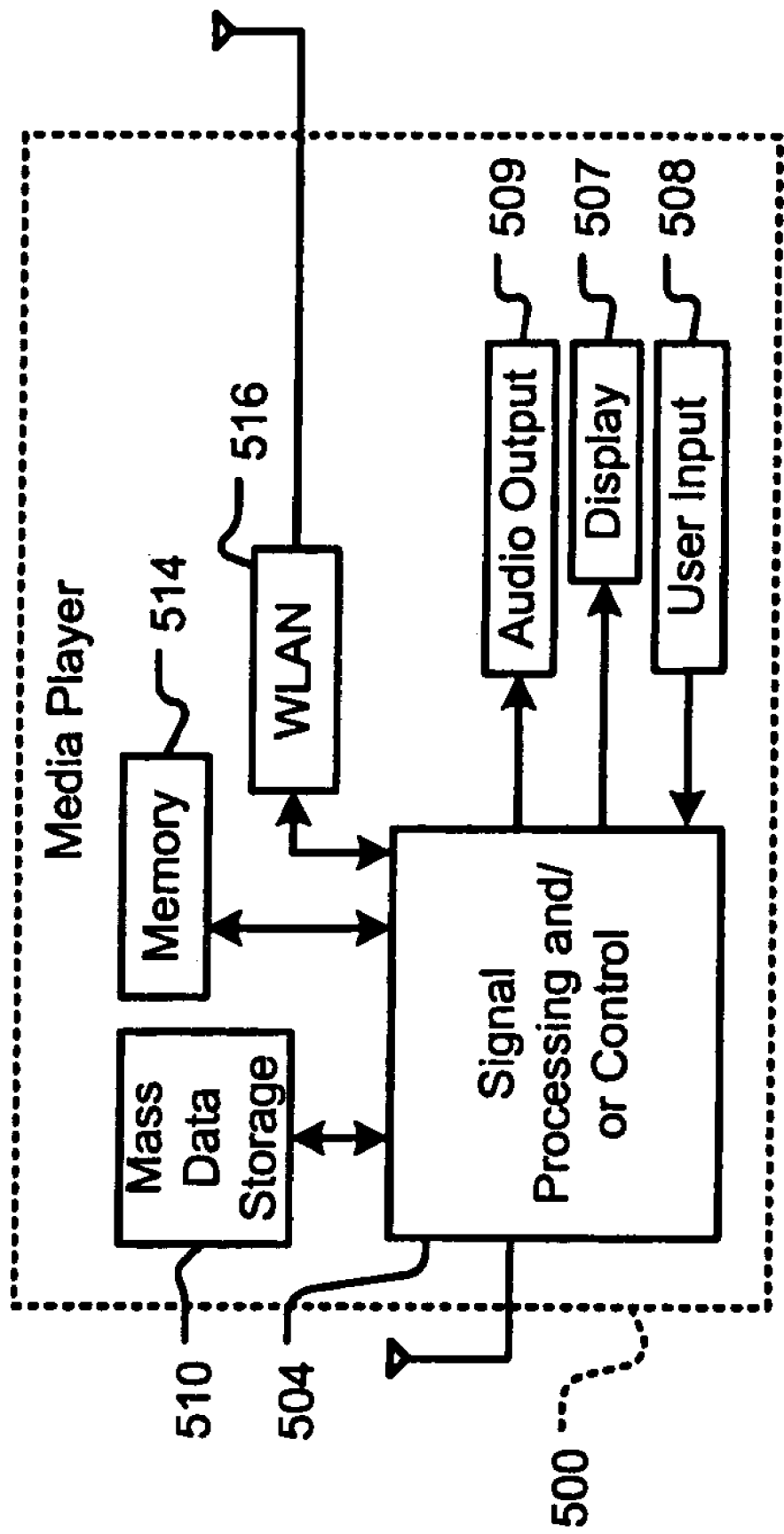
FIG. 4G is a diagram of an exemplary portable media player using a mass storage device according to the present invention.

Referring now to FIG. 4F, the present invention can be implemented in a set top box 480. The present invention may implement mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Referring now to FIG. 4F, the present invention can be implemented in a media player 500. The present invention may implement mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 4A and/or at least one DVD may have the configuration shown in FIG. 4B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

An Exemplary Method

The present invention further relates to method of measuring the fly height in a data storage system, where the fly height is the distance between a read/write head and a surface of a magnetic storage medium. The method includes the steps of (a) measuring the capacitance between the read/write head and the magnetic storage medium, and (b) calculating a value corresponding to the fly height of the read/write head from the measured capacitance In a further embodiment, the method may include the step of adjusting the fly height in response to the signal. In a preferred embodiment, the signal comprises a serial or parallel digital value. In other specific implementations, the measuring step includes the steps of (a) generating a periodic signal with a generally constant voltage slew rate to the read/write head and applying the periodic signal to the read/write head, and (b) measuring the current at the read/write head. The periodic signal with a generally constant voltage slew rate may comprise a triangle wave.

In a further embodiment, the step of measuring the current at the read write head includes the steps of (a) applying a counter-current to the read/write head, (b) comparing a voltage (or potential) at the read/write head to a ground or reference voltage potential, and (c) adjusting the counter-current until the voltage potential at the read/write head substantially equals the ground or reference voltage potential. In this case, the output signal value corresponding to the fly height of the read/write head may comprise a digital value corresponding to the counter-current.

In one example, when the voltage at the read/write head substantially differs from ground or the reference voltage, the output of the comparing step comprises a pulse, typically generated in response to the periodic signal. Thus, the method may further comprise generating a pulse in response to the periodic signal or triangle wave when the voltage at the read/write head differs by more than a threshold amount from ground or the reference voltage. In further embodiments of this example, the method further comprises counting the pulses from the comparing step, and/or producing a (counter)current in response to (or corresponding to) the number of pulses.

Figure 7:
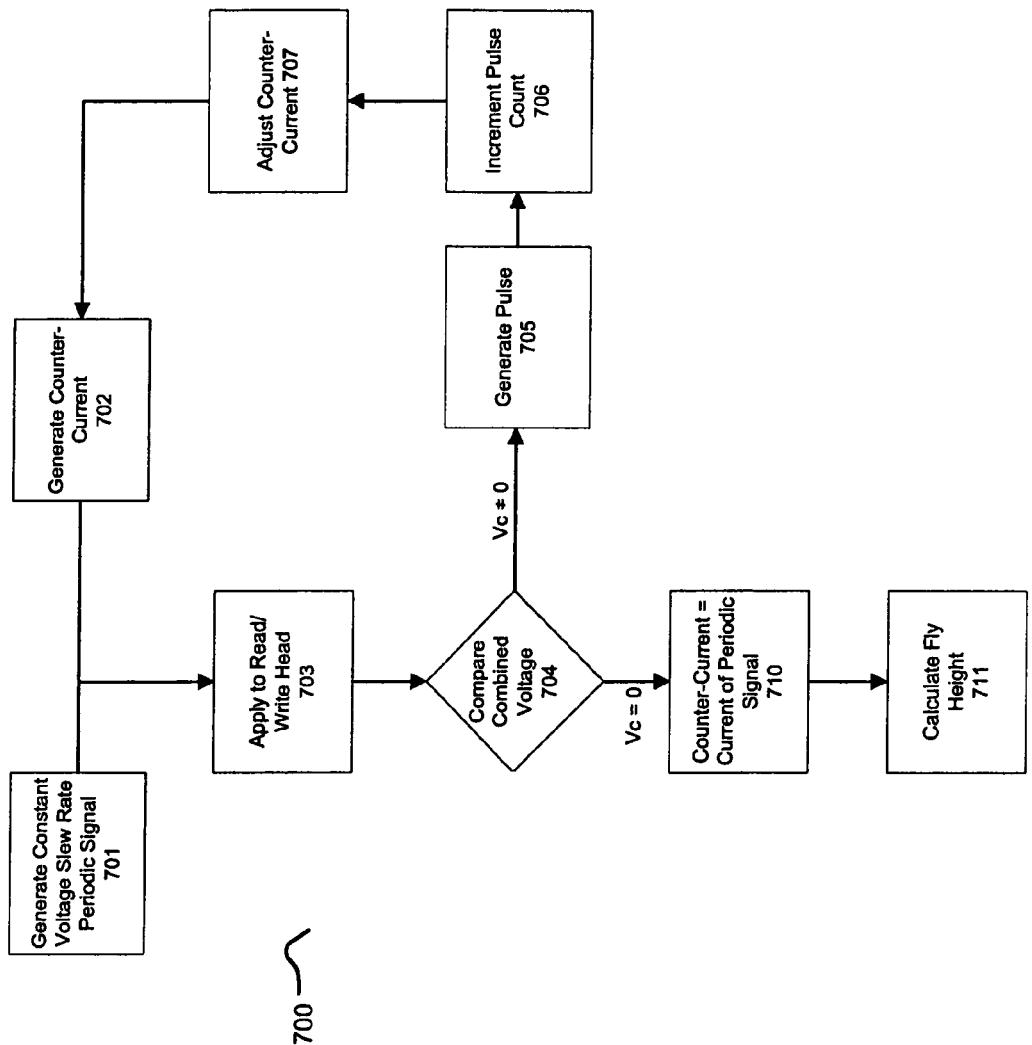
FIG. 7 is a flow chart of an exemplary method of capacitive fly height measurement according to the present invention.

Referring now to FIG. 7, the method 700 for measuring fly height includes the steps of generating (701) a periodic signal with a constant voltage slew rate (e.g. triangle wave 601 of FIG. 6), and generating (702) a counter-current. The method further comprises applying (703) both the signal and the counter-current to the read/write head. Step 704 compares the voltage at the read/write head to ground. If the combined voltage is not equal to ground, then at step 705 a pulse (e.g. pulse 602 of FIG. 6) may generated in response to the periodic signal. At step 706 the pulse count may be increased, or, if the count has reached the limit of the counter, rolled over to zero. Finally, at step 706 the counter-current may be adjusted in response to the count. Thus, steps 702–707 form a continuous feedback loop wherein the counter-current is adjusted until it cancels out the current of the periodic signal. When the counter-current cancels out the current of the periodic signal, then the combined voltage (V) will generally equal ground (step 705). The fly height may then be calculated at step 706.

CONCLUSION/SUMMARY

Thus, the present invention provides a circuit, system, and method for measuring the fly height of a read/write head in a magnetic data storage system by measuring the capacitance between the read/write head and the magnetic storage medium. The circuitry generally comprises (a) a capacitance measurement circuit configured to measure the capacitance between the read/write head and the surface of the magnetic recording medium (or a derivative of that capacitance), and (b) a fly height converter configured to produce an output signal corresponding to the fly height. The systems generally comprise those that include a circuit embodying one or more of the inventive concepts disclosed herein. The methods generally comprise the steps of (a) measuring the capacitance between the read/write head and the magnetic storage medium, and (b) calculating a value corresponding to the fly height of the read/write head from the measured capacitance.

The present invention advantageously provides for electronically measuring, in the storage system's control circuitry, the fly height of a read/write head in situ in a magnetic storage system using the capacitive technique. The system may use the capacitive fly height measurement to control fly height actuation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for measuring a fly height in a magnetic data storage system, wherein said fly height comprises a distance between a read/write head and a surface of a storage medium, said circuit comprising:
    a) a capacitance measurement circuit configured to measure a capacitance between said read/write head and said surface, or a derivative of said capacitance, wherein said capacitance measurement circuit comprises:
        a1) an input receiving a periodic signal with a generally constant voltage slew rate, coupled to said read/write head, and
        a2) a current measuring circuit coupled to said read/write head; and
    b) a fly height converter configured to produce an output signal corresponding to said fly height.

2. The circuit of claim 1, wherein said capacitor measurement circuit provides a digital output.

3. The circuit of claim 1, wherein said periodic signal comprises a triangle wave.

4. The circuit of claim 1, wherein said current measuring circuit comprises:
    a) a current generator coupled to said read/write head;

b) a comparing circuit configured to compare a voltage at said read/write head to a ground potential or reference voltage; and c) an adjustment circuit configured to adjust said current generator in response to an output of said comparing circuit.

5. The circuit of claim 4, wherein said comparison output comprises a pulse in response to said periodic signal when said voltage at said read/write head substantially differs from said ground potential or reference voltage.

6. The circuit of claim 5, wherein said adjustment circuit comprises a counter configured to count pulses of said comparison output, and said current generator is configured to produce a current output in response to a number of said pulses.

7. The circuit of claim 6, wherein said current generator comprises a digital-to-analog converter (DAC).

8. The circuit of claim 6, wherein said fly height output comprises a digital output corresponding to said number of said pulses.

9. A preamplifier comprising the circuit of claim 1.

10. The circuit of claim 1, wherein said capacitance measurement circuit is further configured to derive said capacitance from an output of said current measuring circuit.

11. A digital storage system, comprising:
a) a read/write head;
b) a storage medium;
c) a capacitive fly height measurement circuit configured to measure a capacitance between said read/write head and a surface of said storage medium, and to produce an output corresponding to said capacitance or a derive thereof, wherein said capacitive fly height measurement circuit further comprises:
  c1) an input receiving a periodic signal with a generally constant voltage slew rate, coupled to said read/write head, and
  c2) a current measuring circuit coupled to said read/write head; and
d) a fly height contoller configured to adjust a distance between said read/write head and said surface in response to said output.

12. The digital storage system of claim 11, wherein said fly height output comprises a digital output.

13. The digital storage system of claim 11, wherein said periodic signal comprises a triangle wave.

14. The digital storage system of claim 11, wherein said current generating circuit further comprises:
a) a current generator coupled to said read/write head;
b) a comparing circuit configured to compare a voltage at said read/write head to a ground potential or reference voltage; and
c) an adjustment circuit configured to adjust said current generator in response to an output of said comparing circuit.

15. The digital storage system of claim 14, wherein said comparison output comprises a pulse in response to said periodic signal when said voltage at said read/write head substantially differs from said ground potential or reference voltage.

16. The digital storage system of claim 15, wherein said adjustment circuit comprises a counter configured to count pulses of said comparison output, and said current generator is configured to produce a current output in response to a number of said pulses.

17. The digital storage system of claim 16, wherein said current generator comprises a digital-to-analog converter (DAC).

18. The digital storage system of claim 16, wherein said fly height output comprises a digital output corresponding to said number of said pulses.

19. The digital storage system of claim 11, wherein said capacitive fly height measurement circuit is further configured to derive said capacitance from an output of said current measuring circuit.

20. A method of measuring a fly height in a data storage system, wherein said fly height comprises a distance between a read/write head and a surface of a storage medium, said method comprising:
a) measuring a capacitance between said head and said medium, including the steps of:
  a1) generating a periodic signal with a generally constant voltage slew rate and applying said periodic signal to said read/write head; and
  a2) measuring an electrical current at said read/write head; and
b) calculating a value corresponding to said fly height from the measured capacitance.

21. The method of claim 20, further comprising adjusting said fly height in response to said value.

22. The method of claim 20, wherein said value comprises a digital value.

23. The method or claim 20, wherein said periodic signal comprises a triangle wave.

24. The method of claim 20, wherein said current measuring step (a2) comprises the steps of:
a21) applying a counter-current to said read/write head;
a22) comparing a voltage at said read/write head to a ground potential or reference voltage;
a23) adjusting said counter-current until said voltage at said read/write head substantially equals said ground potential or reference voltage.

25. The method of claim 24, wherein said value comprises a digital value corresponding to said counter-current.

26. The method of claim 20, wherein said step of measuring said capacitance further comprises deriving said capacitance from the measured electrical current.

* * * * *